(12) United States Patent
Nehl

(10) Patent No.: US 6,679,662 B2
(45) Date of Patent: Jan. 20, 2004

(54) EXPANSIBLE PLUG

(75) Inventor: Wolfgang Nehl, Waldachtal (DE)

(73) Assignee: Fischerwerke Artur Fischer GmbH & Co. KG, Waldachtal (DE)

( * ) Notice: Subject to any disclaimer, the term of this patent is extended or adjusted under 35 U.S.C. 154(b) by 0 days.

(21) Appl. No.: 09/999,572

(22) Filed: Nov. 15, 2001

(65) Prior Publication Data

US 2002/0076297 A1 Jun. 20, 2002

Related U.S. Application Data

(63) Continuation-in-part of application No. 08/941,433, filed on Sep. 30, 1997, now abandoned.

(30) Foreign Application Priority Data

Oct. 1, 1995 (DE) .......................................... 196 40 581

(51) Int. Cl.[7] ................................................. F16B 13/14
(52) U.S. Cl. ........................................ 411/80.5; 411/32
(58) Field of Search .......................... 411/55, 60.1, 57.1, 411/59, 908, 80.5, 80.6, 80.1, 80.2, 32, 33

(56) References Cited

U.S. PATENT DOCUMENTS

| 1,499,072 A | * | 6/1924 | Pleister |
| 1,751,818 A | * | 3/1930 | Karitzky |
| 3,187,620 A | * | 6/1965 | Fischer |
| 5,205,688 A | * | 4/1993 | Sunstrom |

FOREIGN PATENT DOCUMENTS

| DE | 1 284 165 | * | 11/1968 |
| DE | 27 05 975 | * | 8/1978 |
| DE | 41 09 120 | * | 9/1992 |
| GB | 1 211 245 | * | 11/1970 |

* cited by examiner

*Primary Examiner*—Flemming Saether
(74) *Attorney, Agent, or Firm*—Michael J. Striker

(57) ABSTRACT

An expansible plug has a plurality of expansible tongues which extend over an expansible region and are expandable radially away from one another under the action of an expanding member, the expansible region being radially oversized.

6 Claims, 7 Drawing Sheets

EXPANSIBLE PLUG

CROSS-REFERENCE TO A RELATED APPLICATION

This application is a continuation-in-part of application Ser. No. 08/941,433 filed Sep. 30, 1997, now abandoned.

BACKGROUND OF THE INVENTION

The present invention relates generally to expansible plugs.

More particularly, it relates to an expansible plug which has expansible tongs over an expansible region and expandable by a screw.

SUMMARY OF THE INVENTION

Accordingly, it is an object of the present invention to provide an expansible plug of the above mentioned general type, which avoids the disadvantages of the prior art.

More particularly it is an object of present invention to develop an expansible plug of the type mentioned so that its anchoring strength in the drilled hole is increased.

In keeping with these objects and with others which will become apparent hereinafter, one feature of present invention resides, briefly stated, in an expansible plug which has expansible tongs extending over an expansible region and expandable by screwing a screw, wherein in accordance with the present invention, the expansible plug is oversized in the expansible region.

The expansible plug according to the invention has, in the region of its expansible tongues, a greater transverse dimension that the drilled hole in which it is to be anchored. On insertion of the expansible plug into the drilled hole, the expansible tongues are pressed radially toward one another with the result that spaces between the expansible tongues narrow or close. That yields large-area contact of the expansible plug against the entire, or at least virtually the entire circumferential surface of the wall of the drilled hole. The contact surface, which is increased in comparison with that of known expansible plugs, improves the hold of the expansible plug according to the invention in the drilled hole and increases its anchoring strength.

In accordance with the present invention the spaces between the expansible tongues are preferably of such dimensions that they close completely or virtually completely at least at the circumference of the expansible plug when the expansible plug is inserted into the drilled hole. As a result, in the expansible region of the expansible plug, a substantially closed circumferential surface is obtained without interruptions between the expansible tongues and thus the largest possible contact surface against the wall of the drilled hole for a given diameter of the drilled hole.

In accordance with a preferred embodiment of the invention, the expansible plug has two expansible tongues, arranged opposite to and spaced from one another, that are, in cross-section, substantially in the shape of a segment of a circle. Between those two expansible tongues there are arranged two further expansible tongues that are slightly spaced from one another at a central portion of the expansible plug and extend radially as far as the outer circumference. The expansible plug has in the region of its expansible tongues a cylindrical surface that is interrupted at the space between expansible tongues. The diameter of this surface is greater than the diameter of the drilled hole into which the expansible plug is to be placed. That arrangement of the expansible plug makes it possible for the expansible tongues to be compressed radially on insertion into the drilled hole in such a manner that the interruptions in the surface close.

In accordance with a further development of the invention, the expansible tongues that are provided between the expansible tongues of circle segment-shaped cross-section are of U-shaped cross-section. A yoke-like wall is provided at the circumference of the expansible plug and rounded to match the diameter of the drilled hole. Leg-like walls of the expansible tongues of U-shaped cross-section run into the inside of the plug. Their free ends are spaced from one another and form a longitudinal guide for the screw to be screwed in. In addition to the good longitudinal guidance of the screw, that construction of the invention has the advantage that the two expansible legs of U-shaped cross-section are pressed away from one another radially by the screw that is screwed in. At the same time, the leg-like walls of those expansible tongues are expanded away from one another radially, at right angles to the direction in which those two expansible tongues are pressed away from one another. As a result, the leg-like walls press away from one another the other two expansible tongues of circle segment-shaped cross-section, likewise, radially relative to the expansible plug and at right angles to the expansible tongues of U-shaped cross-section. The radial expansion of all four expansible tongues produces effective contact in the drilled hole, which yields a high anchoring strength. The torque for screwing in the screw into the expansible plug according to the invention is converted highly efficiently into expansion of the expansible plug.

Preferably, the expansible plug according to the invention has three, especially four or more, expansible tongues. Therefore the expansible plug's does not have a preferred direction. For example, there are no only two expansible tongues capable of taking up greater transverse forces at right angles to a plane lying between its two expansible tongues, that is to say in the direction in which its expansible tongues are expanded away from one another, than in the said plane. A further advantage of the greater number of expansible tongues is the better distribution of the expansion forces over the entire circumference of the drilled hole in which the expansible plug is anchored. That increases the anchoring strength of the expansible plug in the drilled hole. A further advantage is that the more uniform impingement upon the wall of the drilled hole reduces locally high loadings on the wall of the drilled hole and therefore a local collapse of the wall of the drilled hole is avoided, which can result from local deformation or destruction of the masonry in which the drilled hole has been made. That improves the anchoring of the expansible plug especially in soft or porous masonry.

In accordance with a further feature of the present invention, a uniform impingement upon the wall of the drilled hole around its entire circumference is enhanced when in accordance with the present invention the expansible tongues have the cross-sectional area with approximately the same area. Such identically sized cross-sectional areas of the expansible tongues bring about an approximately identically great deformation of the expansible tongues, which, as the expansible plug is expanded, are squeezed between the screw which is expanding them away from one another and the wall of the drilled hole. The approximately identically great deformation results in approximately identical great contact pressure forces of the expansible tongues against the wall of the drilled hole.

The anchoring of the expansible plug in the drilled hole is improved when in the invention at least one of the expansible tongues has one wing element, especially two wing elements opposite to one another and projecting in an approximately tangential direction or in an approximately circumferential direction. Such wing elements increase the resilience of the expansible tongues and bring about an increase in the contact surface.

In accordance with one embodiment of the invention, expansible tongues are provided that are of approximately circle segment-shaped cross-section. That has the advantage that all the expansible tongues can be constructed having the same cross-section. Thereby all the expansible tongues have the same expansion forces.

In another embodiment, the expansible tongues are connected to one another at both ends. That improves a torsion rigidity of the expansible plug and prevents the expansible plug from twisting about its longitudinal axis as the screw is screwed in. It also avoids a situation where one or more expansible tongues is/are pressed aside tangentially in the drilled hole by the screw. As a result, the screw and expansible tongue take up positions adjacent to one another.

In order to guide the screw reliably between the expansible tongues in the longitudinal direction of the expansible plug, in the invention the expansible tongues are constructed having guide grooves that run in the longitudinal direction on their inside sides that face one another. The bordering edges of the guide grooves guide the screw.

The spaces between the expansible tongues preferably form slits in planes that are parallel with one another. The slits can be formed in the injection-moulding by ribs that project parallel with one another into a hollow area of a mould. As a result, the finished expansible plug can be removed without difficulty from an injection moulding die. The expansible plug according to the invention can, as a result, be manufactured using a simple injection moulding die having two corresponding die halves that are arranged in mirror-image having substantially semi-cylindrical recesses into which there extend the ribs for forming the slits between the expansible tongues of the expansible plug, and also a core. In order to facilitate the removal of the expansible plug from the injection moulding die, the slits may broaden out towards the circumference of the expansible plug.

In accordance with a further embodiment of the present invention, the expansible tongues of the expansible plug may be separated from one another over their entire length and may be connected to one another only at one end or at both ends. In that construction of the invention, the expansible tongues can be expanded apart with minimal force, as a result of which the torque for screwing-in the screw is small. In a different construction of the invention, expansible tongues that are adjacent to one another are connected to one another resiliently at individual points along their length or continuously. In that construction of the invention, the longitudinal guidance of the screw to be screwed in is improved.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
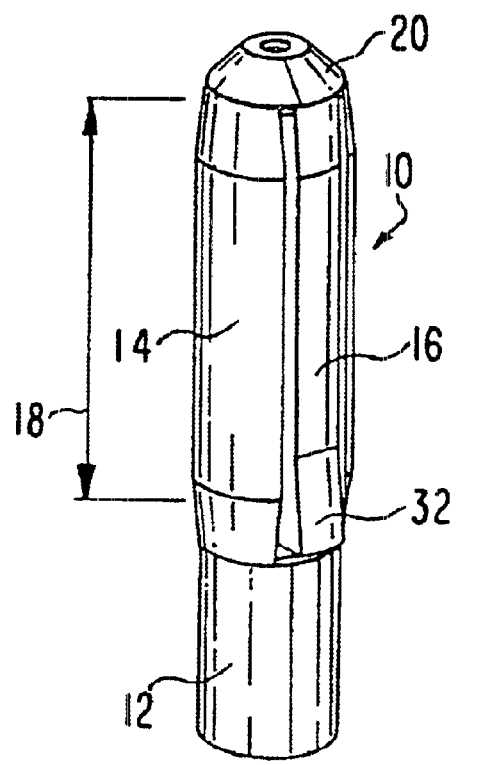
FIG. 1 is a perspective view of an expansible plug according to the invention.
Figure 2:
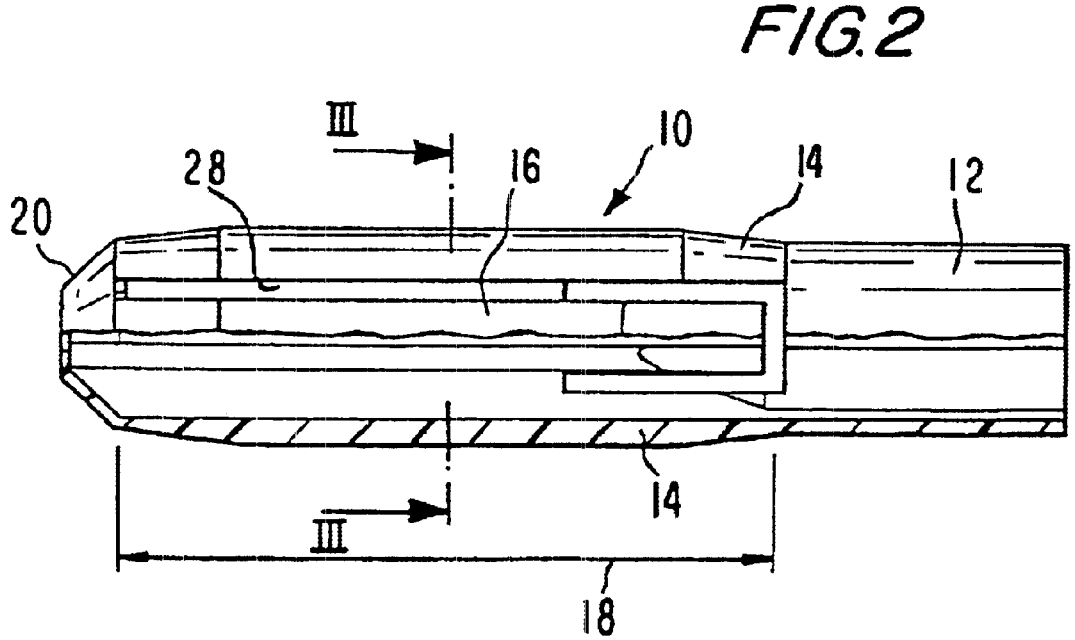
FIG. 2 is an enlarged half-sectional view of the expansible plug from FIG. 1.
Figure 3:
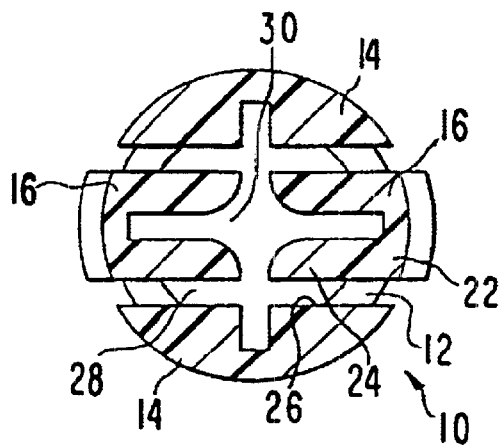
FIG. 3 is an enlarged cross-section along line III—III in FIG. 2.

An expansible plug 10 according to the invention is shown in its basic state in FIGS. 1, 2 and 3. It is manufactured as an injection moulded items in a single piece from plastics, especially from polyamide. It has a tubular insertion sleeve 12 at a rear end. Four expansible tongues 14, 16 extend from the rear end over an expansible region 18 up to a leading end 20 of the expansible plug.

Two expansible tongues 14 opposite to and spaced from one another of circle segment-shaped cross-section. The other two expansible tongues 16 are likewise arranged opposite to one another in a space between the expansible tongues 14 of circle segment-shaped cross-section. The expansible tongues 16 are of U-shaped cross-section and are slightly spaced apart. Yoke-like walls 22 of the expansible tongues 16 of U-shaped cross-section are provided at the periphery of the expansible plug, whilst the leg-like walls 24 thereof project into the inside of the expansible plug 10. The yoke-like walls 22 of the expansible tongues 16 are rounded. A clearance in the form of continuous slits 28 is provided between the leg-sides 26 of the expansible tongues 16 of U-shaped cross-section and base sides 26 of the expansible tongues 14 of circle segment-shaped cross-section. The four expansible legs 14, 16 are movable in relation to one another and can be pressed outward and inward in each case in a radial direction. The expansible legs 14, 16 bound an inner area 30 that extends over the expansible region 18 of the expansible plug 10. The area 30 is of cruciform cross-section.

At the outer circumference, the expansible tongues 14, 16 from a cylindrical surface that is interrupted at the slits 28. The diameter of the surface is greater than the external diameter of the insertion sleeve 12. The external diameter of the insertion sleeve 12 corresponds to a nominal diameter of the expansible plug and thus to the diameter of a drilled hole provided for receiving the expansible plug 10.

Rearward ends of the expansible tongues 16 of U-shaped cross-section are in the form of locking lugs 32 that run outwardly at an angle (FIG. 1). The locking lugs provide the expansible plug 10 with additional hold in the drilled hole. At their rear ends, the expansible tongues 16 of U-shaped cross-section are not connected to the insertion sleeve 12. They are joined, at the leading end 20 of the expansible plug 10, integrally with the expansible tongues 14 of circle segment-shaped cross-section. The expansible tongues 14 of circle segment-shaped cross-section are, at their rearward end, integral with the insertion sleeve 12. As a result the expansible tongues 16 of U-shaped cross-section are integral with the insertion sleeve 12 by way of the expansible tongues 14 of circle segment-shaped cross-section.

Figure 4:
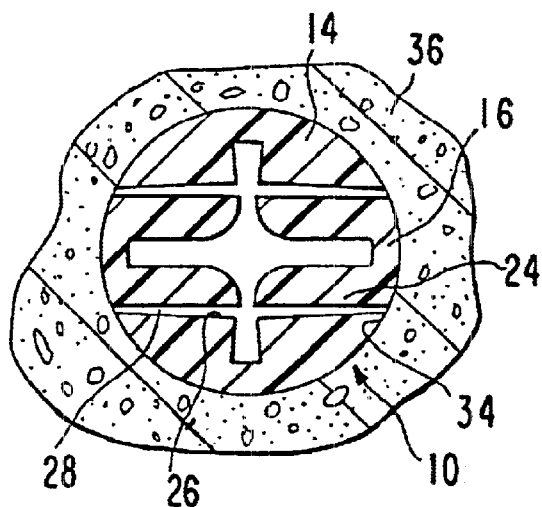
FIG. 4 is the cross-section according to FIG. 3 when the expansible plug has been placed into a drilled hole.

When the expansible plug 10 according to the invention is inserted into a drilled hole 34, for example in masonry 36 of concrete, the four expansible tongues 14, 16 are pressed radially inward towards one another (FIG. 4). In the process, the slits 28 between the expansible tongues 14 of circle segment-shaped cross-section and the expansible tongues 16, lying between them, that are of inwardly-open U-shaped cross-section close to a large extent. As a result, in its expansible region 18, with the exception of small interruptions at the slits 28, the expansible plug 10 rests with its entire surface against the circumferential wall of the drilled hole 34. The expansible plug 10 according to the invention has, as a result, for a given drilled hole diameter, the largest possible contact surface, which provides great anchoring strength in the masonry 36.

For anchoring purposes, a screw (not shown) is inserted into the expansible plug 10 through the insertion sleeve 12 and is screwed in between the expansible tongues 14, 16. During screwing-in, the free ends, facing one another, of the leg-like walls 24 of the expansible tongues 16 of U-shaped cross-section provide good longitudinal guidance along a nominal longitudinal axis of the expansible plug 10, at four points distributed around the circumference of a screw thread of the screw to be screwed in. The screw presses the two expansible legs 16 of U-shaped cross-section radially outwards against the circumferential wall of the drilled hole 34. At the same time, the free ends of the leg-like walls 24 are expanded away from one another and pressed against the base sides 26 of the expansible tongues 14 of circle segment-shaped cross-section. In that matter, the expansible tongues 14 of circle segment-shaped cross-section are pressed away from one another radially, and thus at right angles to the expansible tongues 16 of U-shaped cross-section, and against the circumferential wall of the drilled hole 34. The expansible tongues 14, 16 that are connected to one another only at the leading end 20 and are separated from one another along their entire length provide scarcely any resistance to the screwing-in of the screw. As a result the torque for screwing in the screw is converted highly efficiently into expansion of the expansible legs 14, 16 against the circumferential wall of the drilled hole 34.

In a non-deformed expansible plug 10, the slits 28 between the expansible tongues 14 of circle segment-shaped cross-section and the expansible tongues of U-shaped cross-section are relatively wide relative to the diameter of the expansible plug. That is advantageous from the point of view of the injection moulding because the slits 28 can be manufactured by ribs of an injection moulding die which, by virtue of their thickness, have sufficient stability to rest, without being deformed, the loads that occur during the injection moulding.

Figure 5:
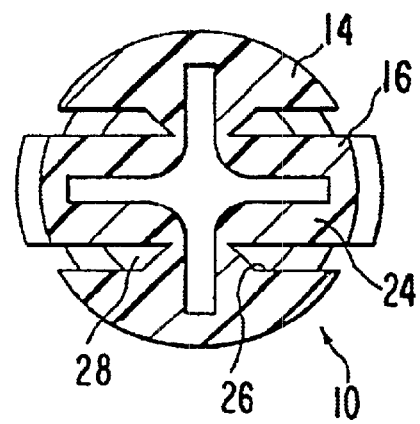
FIG. 5 is a cross-section according to FIG. 3 of a second embodiment of the invention.

FIG. 5 is a cross-section according to FIG. 3 of a second embodiment of an expansible plug 10 according to the invention. In that embodiment of the invention, expansible tongues 14, 16 that are adjacent to one another are connected to one another resiliently along their length. The leg-like walls 24 of the expansible tongues 16 of U-shaped cross-section, at their inner ends, merge integrally with a middle region of the base sides 26 of the expansible tongues 14 of circle segment-shaped cross-section. The slits 28 between the expansible tongues 16 of U-shaped cross-section are not continuous. They end inside the expansible plug 10. That construction of the expansible plug 10 according to the invention improves the longitudinal guidance of a screw as it is being screwed in. Otherwise, the expansible plug 10 shown in FIG. 5 corresponds to the expansible plug 10 show in FIG. 3. Identical reference numeral are used for identical parts and reference should be made in this respect to preceding explanations relation to FIGS. 1 to 4.

Figure 6:
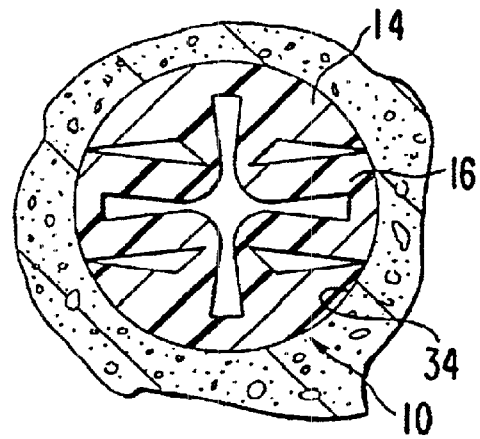
FIG. 6 is the cross-section according to FIG. 5 when the expansible plug has been inserted into a drilled hole.

FIG. 6 shows the cross-section from FIG. 5 when an expansible plug 10 has been placed into a drilled hole 34. The slits 28 between the expansible tongues 14, 16 are completely closed at their outer ends with the results that the expansible tongues 14, 16 rest without interpretation against the circumferential wall of the drilled hole 34.

Figure 7:
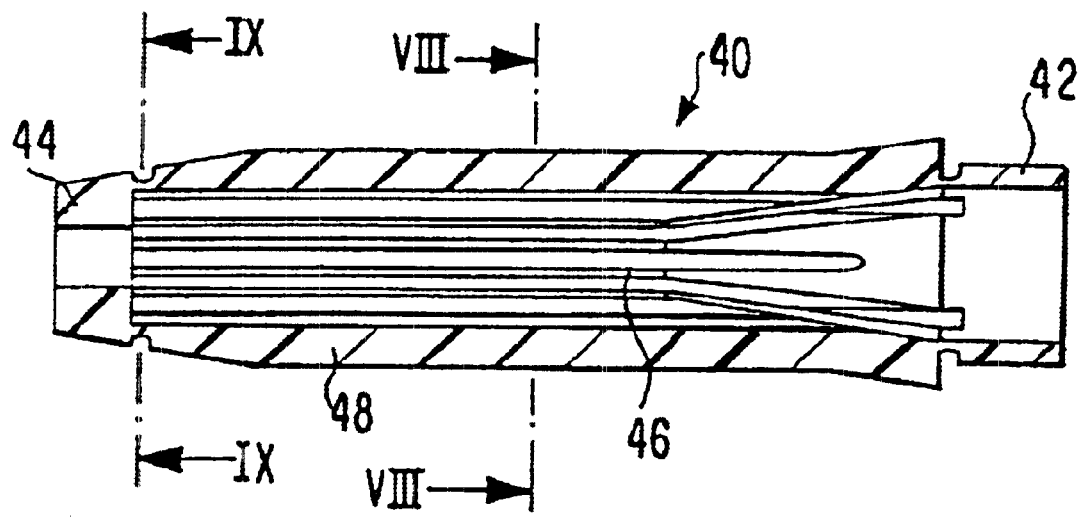
FIG. 7 is an axial section of a third embodiment of an expansible plug according to the invention.
Figure 9:
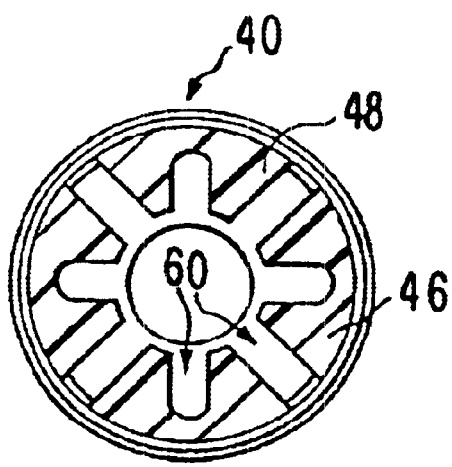
FIG. 9 is a cross-section along line IX—IX in FIG. 7.
Figure 8:
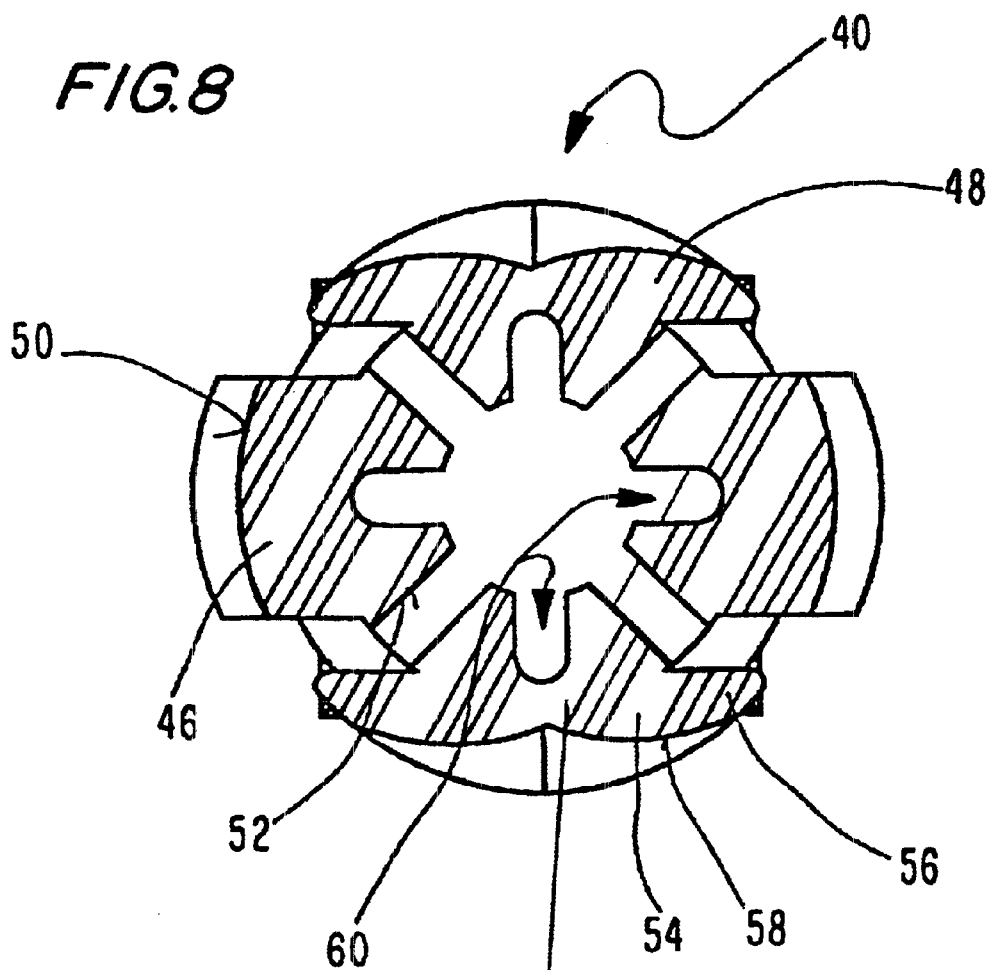
FIG. 8 is a cross-section along line VIII—VIII in FIG. 7.
Figure 10:
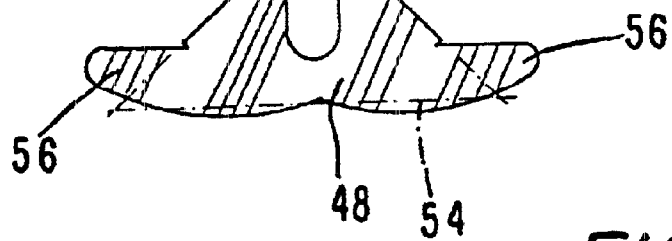
FIG. 10 is a fragment of the cross-section of FIG. 8.
Figure 11:
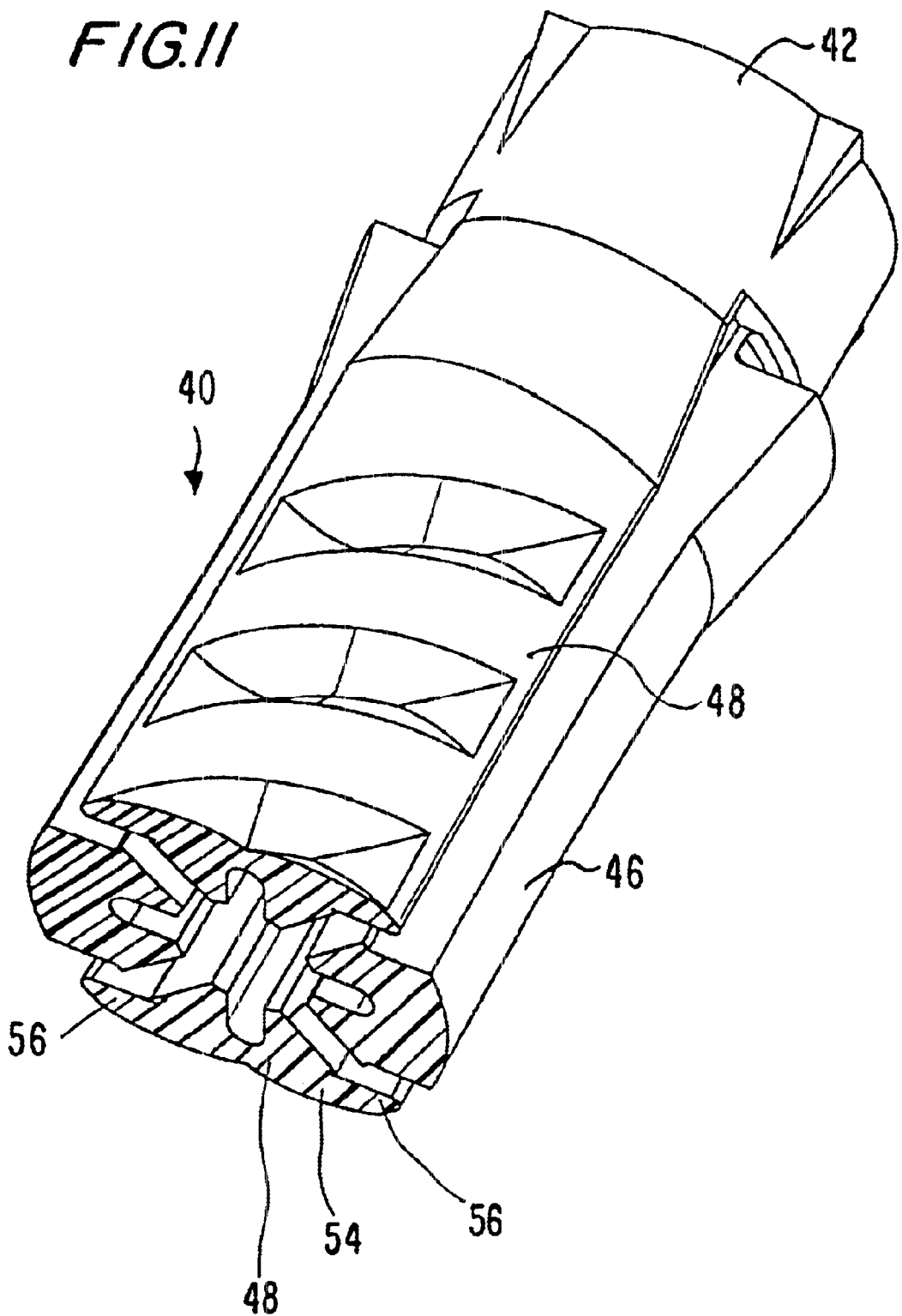
FIG. 11 is a sectioned perspective new of a portion of the expansible plug of the third embodiment.
Figure 12:
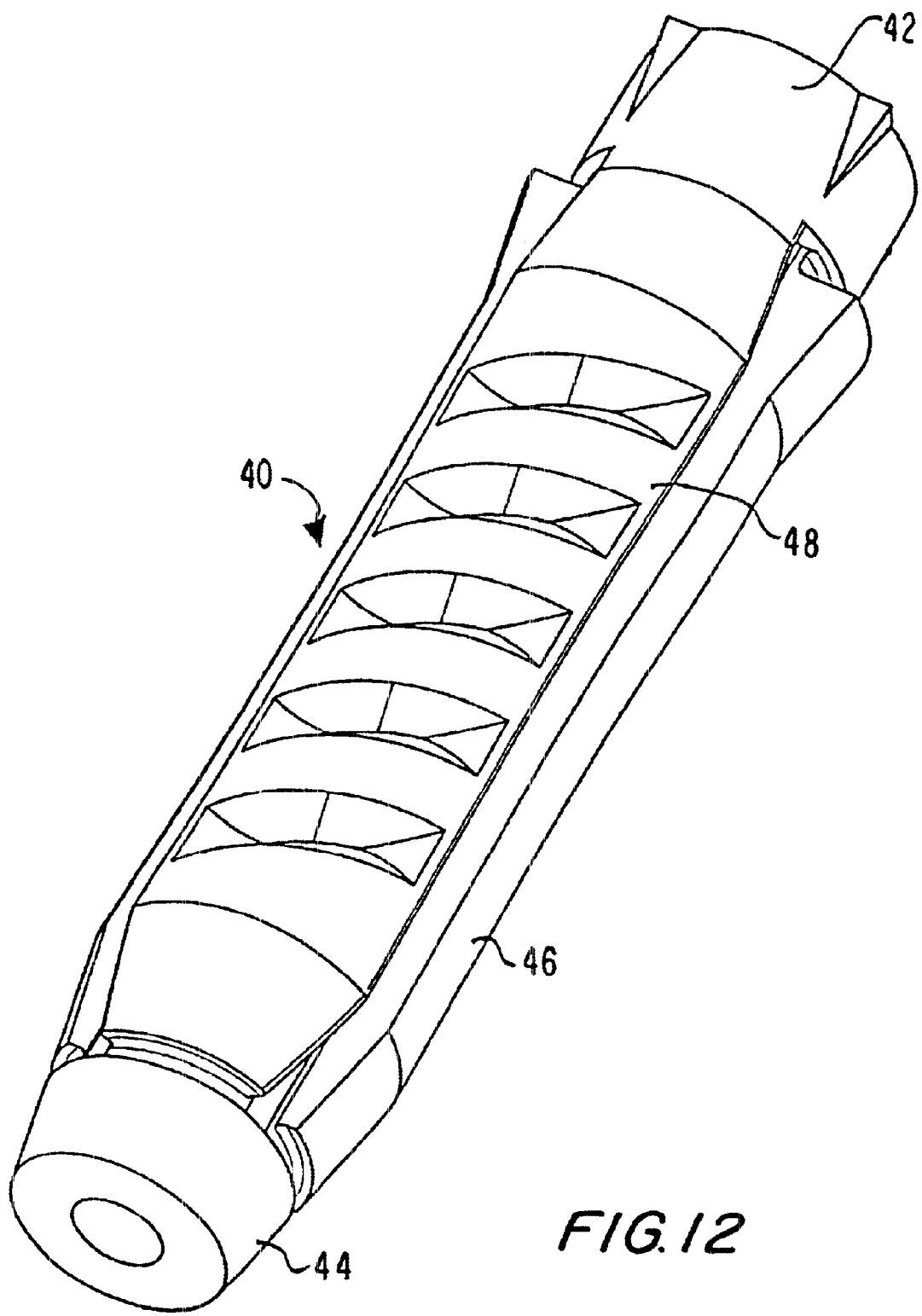
FIG. 12 is a perspective view of the expansible plug of the third embodiment.
Figure 13:
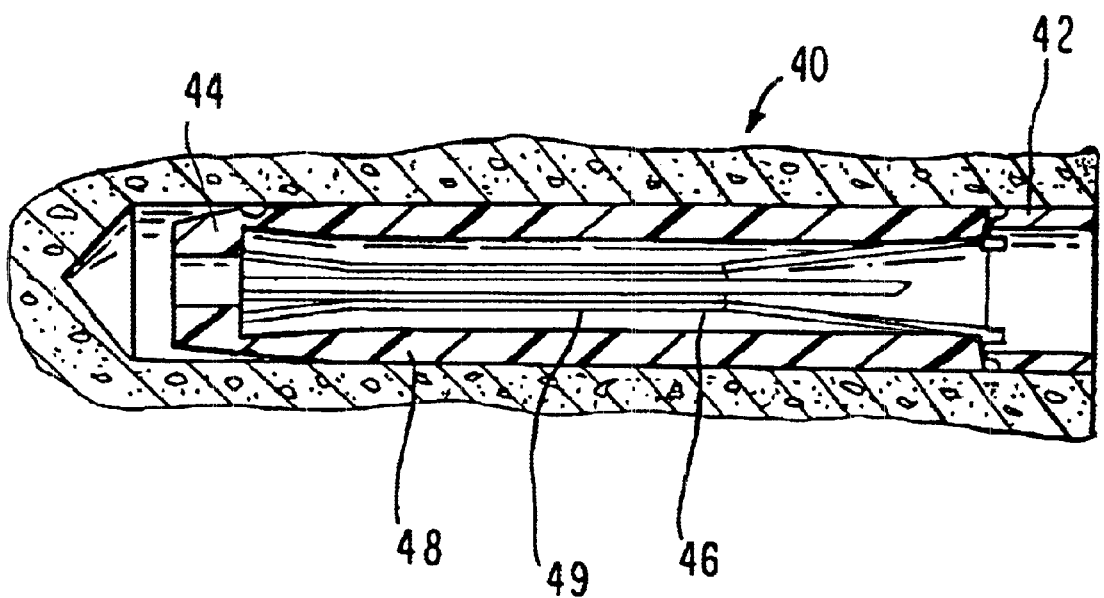
FIG. 13 is a view showing a longitudinal cross section of the inventive expansible plug inside a drilled hole.

The expansible plug 40 according to the invention, shown in its non-deformed basic state in FIGS. 7 to 9, has a tubular insertion sleeve 42 at a rear end and a tubular sleeve 44 at a leading end, between which there extend four expansible tongues 46, 48. All four expansible tongues 46, 48 merge at their ends integrally with the insertion sleeve 42 and with the sleeve 44 at the leading end of the expansible plug 40. As a result, the expansible tongues 46, 48 are connected to one another integrally at both their ends.

For the majority of their length, the expansible tongues 46, 48 are of the cross-sections shown in FIG. 8: two expansible tongues 46, lying opposite to one another, are of approximately rectangular cross-section. Outer surfaces 50 of those expansible tongues 46 have a convexity that corresponds to the curvature of the wall of the drilled hole into which the expansion plug 40 is placed. Inner sides 52, facing one another, of the rectangular expansible tongues 46 are angled triangularly in cross-section.

The other two expansible tongues 48, likewise opposite to one another, have a web 54 of triangular cross-section that runs in the longitudinal direction, from which there project tangentially on both sides wing-shaped elements 56. The wing-elements 56 are integral with the web 54 and extend substantially over the entire length of the expansible tongues 48.

The wing-shaped elements 56 have convex outer surfaces 58. The wing-shaped elements 56 increase the outer surface area of the expansible tongues 48 and accordingly the contact surface of the expansible plug 40 in the drilled hole. By virtue of their resilience, the wing-shaped elements 56 adapt to the wall of the drilled hole on being expanded.

All four expansible tongues 46, 48 on their inner sides that face one another have guide grooves 60 that run in the longitudinal direction. The guide grooves guide, in the axial direction of the expansible plug 40, a screw (not shown), which is screwed through the insertion sleeve 452 between the expansible tongues 46, 48 therof in order to expand the expansible plug 40.

The cross-sections of the expansible tongues 46, 48 change towards the leading end of the expandible plug 40, as shown in FIG. 9; in the region of the leading end, all four expansible tongues 46, 48 are, correspondingly, of circle segment-shaped cross-section. The guide grooves 60 continue over the entire length of the expansible tongues 46, 48 as far as the sleeve 44 at the leading end of the expansible plug 40. The cross-sections of the expansible tongues 46, 48 (this applies also to the expansible tongues 14, 16 of the expansible plug 10 shown in FIGS. 1 to 6) may accordingly change over their length or, alternatively, their cross-section may remain the same over their entire length.

The cross-sectional areas of the expansible tongues 46, 48 of the cross-section shown in FIG. 8 are of approximately the same size.

It will be understood that each of the elements described above, or two or more together, may also find a useful application in other types of constructions differing from the types described above.

While the invention has been illustrated and described as embodied in expansible plug, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An expansible plug, comprising an expansible region a plurality of expansible tongues which extends over said expansible region and are expandable radially away from one another under the action of an expanding member, said expansible tongues being spaced from one another in a circumferential direction as that transverse throughgoing spaces are formed between said expansible tongues over their entire length and therefore said expansible tongues are radially compressible so as to at least narrow said spaces and to reduce a transverse size of said expansible region, said expansible tongues including two expansible tongues which are spaced from one another in a first transverse direction and each provided with wing-shaped elements which extend tangentially to the expansible plug and extend in a second transverse direction which is transverse to said first transverse direction, so as to form free longitudinal edges for improving anchoring of the expansible plug in a drilled hole; a tubular insertion sleeve and another tubular sleeve provided correspondingly at a rear end and at a leading end, said expansible tongues merging into said tubular sleeves in one piece with said tubular sleeves, said expansible region having a larger diameter than a diameter of said tubular sleeve and also having a constant cross section over a major portion of an axial length of the expansible plug, all said tongues being expansible tongues and formed so that by compression of said expansible region to the diameter of said sleeves said spaces between said expansible tongues close at least almost completely over at least almost a whole length of said expansible region.

2. An expansible plug as defined in claim 1, wherein each of said two expansible tongues has two wings elements located opposite to one another and extending in opposite tangential directories.

3. An expansible plug as defined in claim 1, wherein said wing-shaped elements of said expansible tongues have inner surfaces which extend parallel to one another.

4. An expansible plug as defined in claim 1, wherein said expansible tongues have substantially convex outer surfaces.

5. An expansible plug as defined in claim 1, wherein said wing-shaped elements have substantially convex outer surfaces.

6. An expansible plug, comprising an expansible region with a plurality of expansible tongues which extends over said expansible region and are expandable radially away from one another under the action of an expanding member, said expansible tongues being spaced from one another in a circumferential direction and therefore said expansible tongues are radially compressible so as to reduce a transverse size of said expansible region, said expansible tongues including two expansible tongues which are spaced form one another in a first transverse direction and each provided with wing-shaped elements which extend tangentially to the expansible plug and extend in a second transverse direction which is transverse to said first transverse direction, so as to form free longitudinal edges for improving anchoring of the expansible plug in a drilled hole, said wing-shaped elements having inner surfaces which extend parallel to one another, said expansible tongues having substantially convex outer surfaces, and said wing-shaped elements also having substantially convex outer surfaces; a tubular insertion sleeve and another tubular sleeve provided correspondingly at a mar end and at a leading end, said expansible tongues merging into said tubular sleeves in one piece with said tubular sleeves, said expansible region having a larger diameter than a diameter of said tubular sleeve and also having a constant cross-section over a major portion of an axial length of an expansible plug, all said tongues being expansible tongues and formed so that by compression of said expansible region to the diameter of said sleeves said spaces between said expansible tongues close at least almost completely over at least almost a whole length of said expansible region.

* * * * *